(12) United States Patent
Satoguchi et al.

(10) Patent No.: US 6,620,548 B1
(45) Date of Patent: Sep. 16, 2003

(54) SEALED TYPE ALKALINE STORAGE BATTERY

(75) Inventors: Kousuke Satoguchi, Tokushima (JP); Masao Takee, Itano-Gun (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 0 days.

(21) Appl. No.: 09/539,214

(22) Filed: Mar. 30, 2000

(30) Foreign Application Priority Data

Mar. 30, 1999 (JP) .......................................... 11-089581

(51) Int. Cl.$^7$ ............................. H01M 4/52; H01M 4/58
(52) U.S. Cl. .................. 429/223; 429/218.1; 429/218.2
(58) Field of Search ................................ 429/223, 218, 429/218.1, 218.2

(56) References Cited

U.S. PATENT DOCUMENTS

| | | | | |
|---|---|---|---|---|
| 5,032,475 A | * | 7/1991 | Hasebe et al. ............... 429/206 |
| 5,300,371 A | * | 4/1994 | Tomantschger et al. .... 429/164 |
| 5,344,728 A | * | 9/1994 | Ovshinsky et al. .......... 420/580 |
| 5,466,543 A | * | 11/1995 | Ikoma et al. ............. 252/182.1 |
| 5,580,679 A | * | 12/1996 | Tanaka ........................ 429/171 |
| 5,654,114 A | * | 8/1997 | Kubota et al. ............ 429/231.3 |
| 5,744,264 A | * | 4/1998 | Barker ......................... 429/223 |
| 5,766,789 A | * | 6/1998 | James et al. ................... 429/44 |
| 5,783,333 A | * | 7/1998 | Mayer ......................... 423/332 |
| 5,856,043 A | * | 1/1999 | Ohsaki et al. ............... 429/221 |
| 5,861,225 A | * | 1/1999 | Corrigan et al. .............. 205/57 |
| 5,968,684 A | * | 10/1999 | Hayashi et al. .......... 429/218.1 |
| 5,993,995 A | * | 11/1999 | Bernard et al. ............. 429/223 |
| 6,066,416 A | * | 5/2000 | Okada et al. ................ 429/164 |
| 6,077,625 A | * | 6/2000 | Yano et al. .................. 429/223 |
| 6,156,455 A | * | 12/2000 | Yamamura et al. ......... 429/221 |
| 6,177,213 B1 | * | 1/2001 | Fetcenko et al. ........ 429/218.1 |
| 6,190,801 B1 | * | 2/2001 | Tokuda et al. .............. 429/164 |
| 6,268,083 B1 | * | 7/2001 | Iida et al. ................. 429/218.2 |
| 6,287,726 B1 | * | 9/2001 | Ohta et al. .................. 423/332 |

\* cited by examiner

Primary Examiner—Tom Dunn
Assistant Examiner—L. Edmondson
(74) Attorney, Agent, or Firm—Nixon & Vanderhye PC

(57) ABSTRACT

A sealed type alkaline storage battery in which the entire surface of a positive electrode plate is opposed to a negative electrode plate through a separator, wherein a discharge capacity ratio of the negative electrode plate to the positive electrode plate is determined to be more than or equal to 1.9, an area ratio of the negative electrode plate to the positive electrode plate is determined to be less than or equal to 1.4, and the thickness of the positive electrode plate is determined to be less than or equal to 0.6 mm

2 Claims, 3 Drawing Sheets

SEALED TYPE ALKALINE STORAGE BATTERY

BACKGROUND OF THE INVENTION

1. Field of the Invention

The present invention relates to a sealed type alkaline storage battery such as a nickel-metal hydride storage battery, a nickel-cadmium storage battery or the like, and more particularly to optimal adjustment of a discharge capacity ratio and an area ratio of positive and negative electrode plates in the alkaline storage battery.

2. Description of the Prior Art

In a sealed type alkaline storage battery such as a nickel-metal hydride storage battery, a nickel-cadmium storage battery or the like, the discharge capacity of a negative electrode plate is adjusted larger than that of a positive electrode plate to restrain hydrogen gas generated from the negative electrode plate at charging and to absorb oxygen gas generated from the positive electrode plate thereby to restrain an increase of internal pressure of the battery.

In general, a sealed type alkaline storage battery of this kind includes a group of spiral electrodes composed of sheet-like positive and negative electrode plates spirally wound through a separator in such a manner that the negative electrode plate is placed at an outermost periphery of the group of spiral electrodes whereas the positive electrode is placed at an innermost periphery of the group of spiral electrodes In such a structure of the group of spiral electrodes, sufficient utilization of an active material in the positive electrode plate may not be effected since the positive electrode plate is not opposed to the negative electrode plate at its one surface The reaction area of the electrode plates is limited in a small extent at the innermost periphery of the group of spiral electrodes, and the capacity of the positive electrode plate becomes larger than that of the negative electrode plate Due to such imbalance of the positive and negative electrode plates in discharge capacity, the negative electrode plate does not effect sufficient absorption of oxygen gas generated from the positive electrode plate at over-charging, and hydrogen equilibrium potential increases. This causes an increase of internal pressure of the storage battery. Particularly, such a problem is raised in the nickel-metal hydride storage battery since the generation amount of hydrogen gas increases un accordance with equilibrium pressure of hydrogen gas. Accordingly, to increase the life span of the sealed type alkaline storage battery, it is indispensable to restrain the generation of hydrogen gas in balance with absorption of oxygen gas.

SUMMARY OF THE INVENTION

A primary object of the present invention is to provide a sealed type alkaline storage battery wherein a discharge capacity ratio and an area ratio of positive and negative electrode plates are optimized to restrain the generation of hydrogen gas in balance with absorption of oxygen gas thereby to increase the life span of the storage battery.

According to the present invention, the object is accomplished by providing a sealed type alkaline storage battery in which entire surface of a positive electrode plate is opposed to a negative electrode plate through a separator, wherein a discharge capacity ratio of the negative electrode plate to the positive electrode plate is determined to be more than or equal to 1.9, an area ratio of the negative electrode plate to the positive electrode plate is determined to be less than or equal to 1.4, and the thickness of the positive electrode plate is determined to be less than or equal to 0.6 mm.

By the fact that the discharge capacity ratio of the negative electrode plate to the positive electrode plate is more than or equal to 1.9, the hydrogen absorbing property at charging is enhanced to restrain the generation of hydrogen gas from the negative electrode plate. By the fact that the area ratio of the negative electrode plate to die positive electrode plate is less than or equal to 1.4, the area of the negative electrode plate opposed to the positive electrode plate is increased to enhance the reducing absorption property of oxygen gas generated from the positive electrode plate at charging. In addition, by the fact that the thickness of the positive electrode plate is less than or equal to 0.6 mm, the oxygen gas generated at charging is effectively transferred to the surface of the negative electrode plate to enhance the reducing absorption property of oxygen gas at the negative electrode plate. As a result an increase of internal pressure of the storage battery caused by accumulation of hydrogen gas and oxygen gas is restrained to enhance the continual discharge characteristic of the storage battery.

In a practical embodiment of the present invention, it is preferable that nickel hydroxide covered with cobalt compound containing sodium is used as an active material of the positive electrode plate to increase the generation potential of oxygen gas thereby to restrain the generation of oxygen gas and to enhance the charging property of nickel hydroxide. As the cobalt compound containing sodium is superior in conductivity, the conductivity between particles of nickel hydroxide is enhanced to increase the life span of the storage battery. In addition, in the case that the nickel hydroxide covered with the cobalt compound containing sodium is added with at least one of oxide powders of yttrium (Y), Ytterbium (Yb), erbium (Er) and gadolinium (Gd), the generation potential of oxygen gas is increased by the multiplication effect of the cobalt compound and the oxide powder to restrain the generation of oxygen gas and to enhance the charging property of nickel hydroxide.

BRIEF DESCRIPTION OF THE DRAWINGS

Other objects, features and advantages of the present invention will be more readily appreciated from the following detailed description of a preferred embodiment thereof when taken together with the accompanying drawings, in which.

DESCRIPTION OF THE PREFERRED EMBODIMENT

Figure 1:
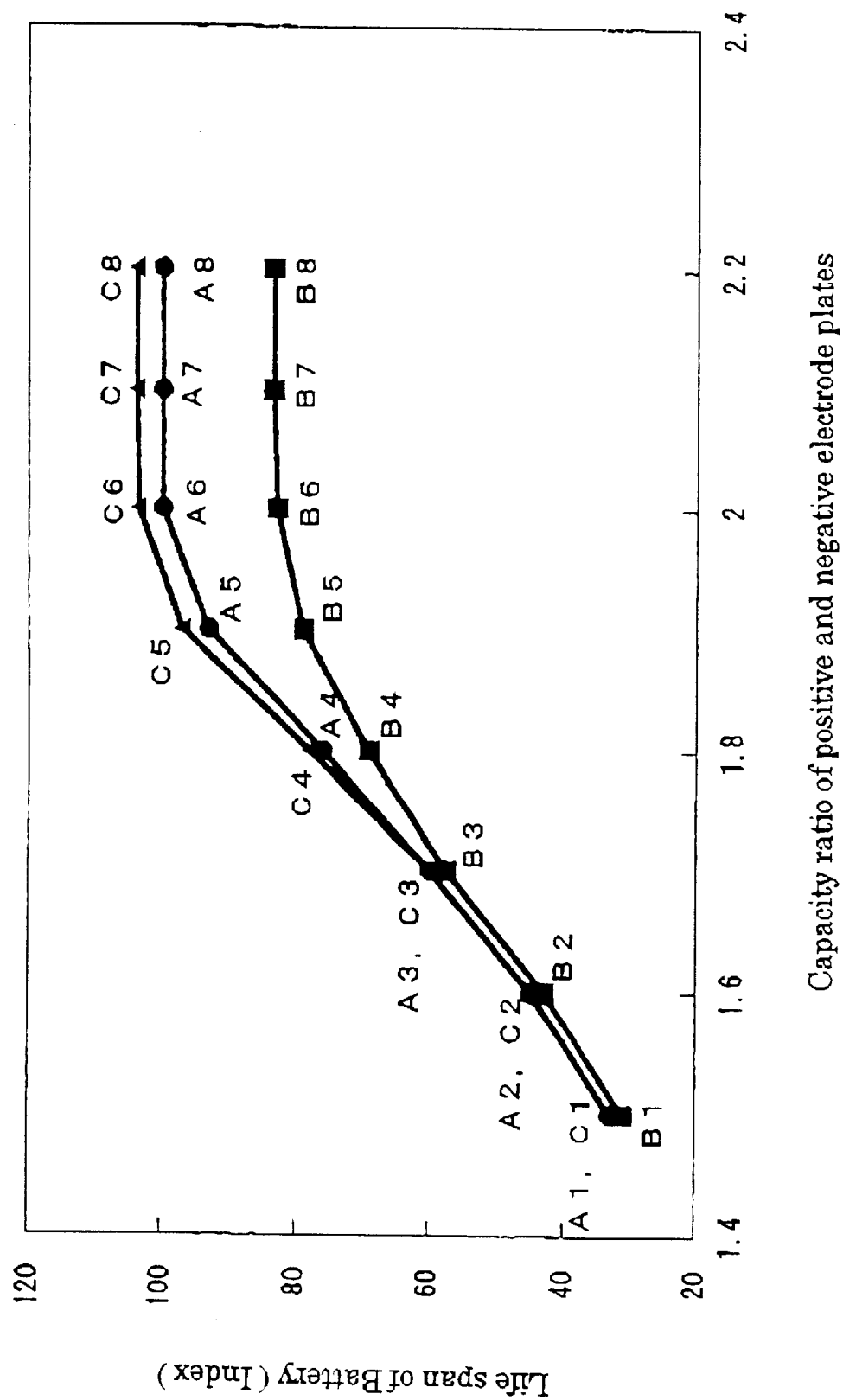
FIG. 1 is a graph showing each life span of storage batteries in relation to a discharge capacity ratio of positive and negative electrode plates.

Hereinafter, a preferred embodiment of the present invention will be described in detail with reference to the drawings.

1. Production of Positive Electrode Plate (1) Preparation of Compound Particles Nickel hydroxide powder of 100 g was introduced into water of 1000 ml containing cobalt sulfate of 14.3 g and added with an aqueous solution of sodium hydroxide of 1 mol. while being stirred to adjust pH of the aqueous solution to "11". Thereafter, the aqueous solution was reacted by stirring for one hour. In this instance, a pH meter in the form of a glass electrode was used to monitor the pH of the aqueous solution. Subsequently, the precipitate of the aqueous solution was filtered, washed with water and dried in a vacuum to prepare compound particles in the form of particles of nickel hydroxide covered with cobalt hydroxide.

Powder of the compound particles was remixed with 25% by weight of an aqueous solution of sodium hydroxide at a ratio of 1:10 and heated at 80° C. for eight hours in the air. Thereafter, the mixture of the compound particles and aqueous solution of sodium hydroxide was washed with water and dried at 65° C. to produce compound particles in the form of particles of nickel hydroxide covered with cobalt compound containing sodium. As a result of measurement by an atomic absorption spectroscopy, it was confirmed that the weight of cobalt in the compound particles was 5% by weight relative to nickel hydroxide.

(2) Preparation of Paste 100 parts by weight of the compound particles (of 10 μm in average particle diameter) was mixed with 7.6 parts by weight of powder of yttrium sesquioxide (Y2O3) of 1 μm in average particle diameter (containing 3 parts by weight of yttrium) and 20 parts by weight of 1 wt % methyl cellulose as a binder and kneaded to prepare a paste. In a practical embodiment, the powder of yttrium sesquioxide (Y2O3) may be substituted for oxide powder of ytterbium (Yb), erbium (Er) or gadolinium(Gd).

(3) Production of Non-sintered Type Nickel Positive Electrode Plate

The paste was impregnated into pores of a foamed nickel substrate plate of 95% in porosity and 200 μm in average particle diameter and formed under pressure after dried to produce a non-sintered type nickel positive electrode plate.

2. Production of Negative Electrode Plate (1) Preparation of Powder of Hydrogen Absorbing Alloy Misch metal (essentially consisting of a rare-earth element such as Mm; La, Ce, Nd, Pr), nickel, cobalt, aluminum and manganese mixed at an element ratio of 1.0:3.4:0.8:0.2:0.6 were contained in a pot and introduced into a high frequency melting furnace. After molten in the furnace, the mire of the metal elements was cooled to produce an ingot of hydrogen absorbing alloy represented by a formula $Mm_{1.0}Ni_{3.4}Co_{0.8}Al_{0.2}Mn_{0.6}$. The ingot of hydrogen absorbing alloy was pulverized into powder of 60 μm in average particle diameter in an atmosphere of inert gas.

(2) Production of Negative Electrode Plate of Hydrogen Absorbing Alloy

The powder of hydrogen absorbing alloy was added with 1.0 part by weight of powder of polyethylene oxide as a binder and an amount of ion-exchange water and kneaded to prepare a slurry of hydrogen absorbing alloy Thus, the slurry of hydrogen absorbing alloy was coated on opposite surfaces of a punched sheet metal, rolled under pressure after dried and cut into a predetermined length to produce a negative electrode plate of hydrogen absorbing alloy.

3. Manufacture of Nickel-metal Hydride Storage Battery (1) Storage Batteries A1–A8

In preparation of the positive and negative electrode plates, an area ratio of the negative electrode plate to the positive electrode plate was determined to be 1.4, the thickness of the positive electrode plate was determined to be 0.5, and each discharge capacity ratio of the negative electrode plate to the positive electrode plate was determined to be 1.5, 1.6, 1.7, 1.8, 1.9, 2.0, 2.1 and 2.2. Thus, the positive and negative electrode plates were spirally wound through a separator of non-woven polyolefin fabric in such a maser that the negative electrode plate is placed at an outermost periphery. In such a manner as described above, each group of spiral electrodes a1–a8 was manufactured and contained in a bottomed cylindrical cell casing made of metal.

Thereafter, a negative lead extended from the negative electrode plate was welded to a bottom of the cell casing, while a positive lead extended from the positive electrode plate was welded to a positive terminal in the form of a closure element. Subsequently, the cell casing was supplied with an amount of electrolyte (30% by weight of alkaline solution essentially comprised of sodium hydroxide and potassium hydroxide containing lithium hydroxide), and the closure element was coupled within an opening end of the cell casing through a gasket and secured in place by caulking to manufacture closed type nickel-metal hydride storage batteries A1–A8 each of 1500 mAh in nominal capacity.

(2) Storage Batteries B1–B8

In preparation of the positive and negative electrode plates, an area ratio of the negative electrode plate to the positive electrode plate was determined to be 1.5, the thickness of the positive electrode plate was determined to be 0.5, and each discharge capacity ratio of the negative electrode plate to the positive electrode plate was determined to be 1.5, 1.6, 1.7, 1.8, 1.9, 2.0, 2.1 and 2.2. Thus, the positive and negative electrode plates were spirally wound through a separator of non-woven polyolefin fabric in such a manner that the negative electrode plate is placed at an outermost periphery. In such a manner as described above, each group of spiral electrodes b1–b8 was manufactured and contained in a bottomed cylindrical cell casing made of metal.

Thereafter, a negative lead extended from the negative electrode plate was welded to a bottom of the cell casing, while a positive lead extended from the positive electrode plate was welded to a positive terminal in the form of a closure element. Subsequently, the cell casing was supplied with an amount of electrolyte (30% by weight of alkaline solution essentially comprised of sodium hydroxide and potassium hydroxide containing lithium hydroxide), and the closure element was coupled within an opening end of the cell casing through a gasket and secured in place by caulking to manufacture closed type nickel-metal hydride storage batteries B1–B8 each of 1500 mAh in nominal capacity.

(3) Storage Batteries C1–C8

In preparation of the positive and negative electrode plates, an area ratio of the negative electrode plate to the positive electrode plate was determined to be 1.3, the thickness of the positive electrode plate was determined to be 0.5, and each discharge capacity ratio of the negative electrode plate to the positive electrode plate was determined to be 1.5, 1.6, 1.7, 1.8, 1.9, 2.0, 2.1 and 2.2, respectively. Thus, the positive and negative electrode plates were spirally wound through a separator of non-woven polyolefin fabric in such a manner that the negative electrode plate is placed at an outermost periphery in such a manner as described above, each group of spiral electrodes c1–c8 was manufactured and contained in a bottomed cylindrical cell casing made of metal.

Thereafter, a negative lead extended from the negative electrode plate was welded to a bottom of he cell casing, while a positive lead extended from the positive electrode plate was welded to a positive terminal in the form of a closure element. Subsequently, the cell casing was supplied with an amount of electrolyte (30% by weight of alkaline solution essentially comprised of sodium hydroxide and potassium hydroxide containing lithium hydroxide), and the closure element was coupled within an opening end of the cell casing through a gasket and secured in place by caulking to manufacture closed type nickel-metal hydride storage batteries C1–C8 each of 1500 mAh in nominal capacity.

4. Continual Charging Test

The nickel-metal hydride storage batteries A1–A8, B1–B8 and C1–C8 each were continually charged by a charging current of 150 mA at 40° C. for fourteen days. Thereafter, the storage batteries were rested at 25° C. for three hours. Subsequently, the storage batteries each were as discharged at 1500 mA in an atmosphere of 25° C. until the final voltage becomes 1.0 V The cycle of charging and discharging was repeated to measure the number of days during which the storage batteries become ineffective at discharging. In this instance, when each discharge capacity of the storage batteries decreased less than 10% of the discharge capacity before the charging test, the storage batteries were deemed as ineffective at discharging A result of the measurement is shown in FIG. 1, wherein each life span of the storage batteries is shown in relation to each discharge capacity ratio of the negative electrode plate to the positive electrode plate, and wherein each life span is represented by a relative index in the case that the life span of the storage battery A6 is defined as 100.

As is understood from FIG. 1, the following facts have been confirmed In the case that the area ratio of the negative electrode plate to the positive electrode plate is determined to be 1.3, 1.4 and 1.5 respectively, the life span of Be storage battery is increased when the discharge capacity ratio of the negative electrode plate to the positive electrode plate is determined to be less than or equal to 1.9. If the discharge capacity ratio of the negative electrode plate to the positive electrode plate is more than 1.9, the life span of the storage battery will be maintained approximately constant in spite of increase of the discharge capacity ratio of the electrode plates. In measurement of internal pressure of the storage battery at an initial stage of the cycle of charging-and-discharging, a life span sugar to that at each area ratio of the positive and negative electrode plates was obtained. From these facts, it is assumed that the life spin of the battery is increased by restraint of an increase of internal pressure of the battery.

In this respect it is seemed that the generation of hydrogen gas from the negative electrode plate is restrained in accordance with an increase of the discharge capacity ratio of the negative electrode plate to the positive electrode plate unless the discharge capacity ratio is determined to be more than 1.9. With respect to the fact that the life span of the battery increases in a condition where the area ratio of the negative electrode plate to the positive electrode plate is reduced from 1.5 to 1.4 and further reduced from 1.4 to 1.3, it is seemed that such increase of the life span is caused by an increase of reducing absorption of oxygen gas generated from the positive electrode plate at charging.

From the foregoing facts, it has been confirmed that a nickel-metal hydride storage battery superior in the continual charging characteristic can be provided if the area ratio of the negative electrode plate to the positive electrode plate is decreased taking into account an increase of the discharge capacity ratio of the electrode plates.

5. Investigation of an Area Ratio of Positive and Negative Electrode Plates

Based on the above investigation, an influence to the continual charging characteristic caused by the area ratio of positive and negative electrode plates was investigated as follows:

The thickness of the nickel positive electrode plate was determined to be 0.5 mm such that the discharge capacity ratio of the negative electrode plate of hydrogen absorbing alloy to the nickel positive electrode plate becomes 2.0, while the area ratio of the negative electrode plate to the positive electrode plate was determined to be 1.1, 1.2, 1.6 and 1.7, respectively. Thus, each group of spiral electrodes d1, d2, d3, d4 was manufactured by spirally winding the positive and negative electrode plates through the separator of non-woven polyolefin fabric in such a manner that the negative electrode plate is placed at the outermost periphery of each group of spiral electrodes.

Each group of spiral electrodes d1–d4 was contained in a bottomed cylindrical cell casing made of metal Thereafter, a negative lead extended from the negative electrode plate was welded to a bottom of the cell casing, while a positive lead extended from the positive electrode plate was welded to a positive terminal in the form of a closure element. Subsequently, the cell casing was supplied with an amount of electrolyte (30% by weight of alkaline solution essentially comprised of sodium hydroxide and potassium hydroxide containing lithium hydroxide), and the closure element was coupled within an opening end of the cell casing through a gasket and secured in place by caulking to manufacture closed type nickel-metal hydride storage batteries D1–D4 each of 1500 mAh in nominal capacity.

The storage batteries D1–D4 were continually charged at 40° C. for fourteen days to measure the life span of each of the storage batteries. A result of the measurement is shown in FIG. 2, wherein the life span of each the storage batteries is shown in relation to each area ratio of the positive and negative electrode plates, and wherein the life span is represented by a relative index in the case that the life span of the storage battery A6 is defined as 100.

Figure 2:
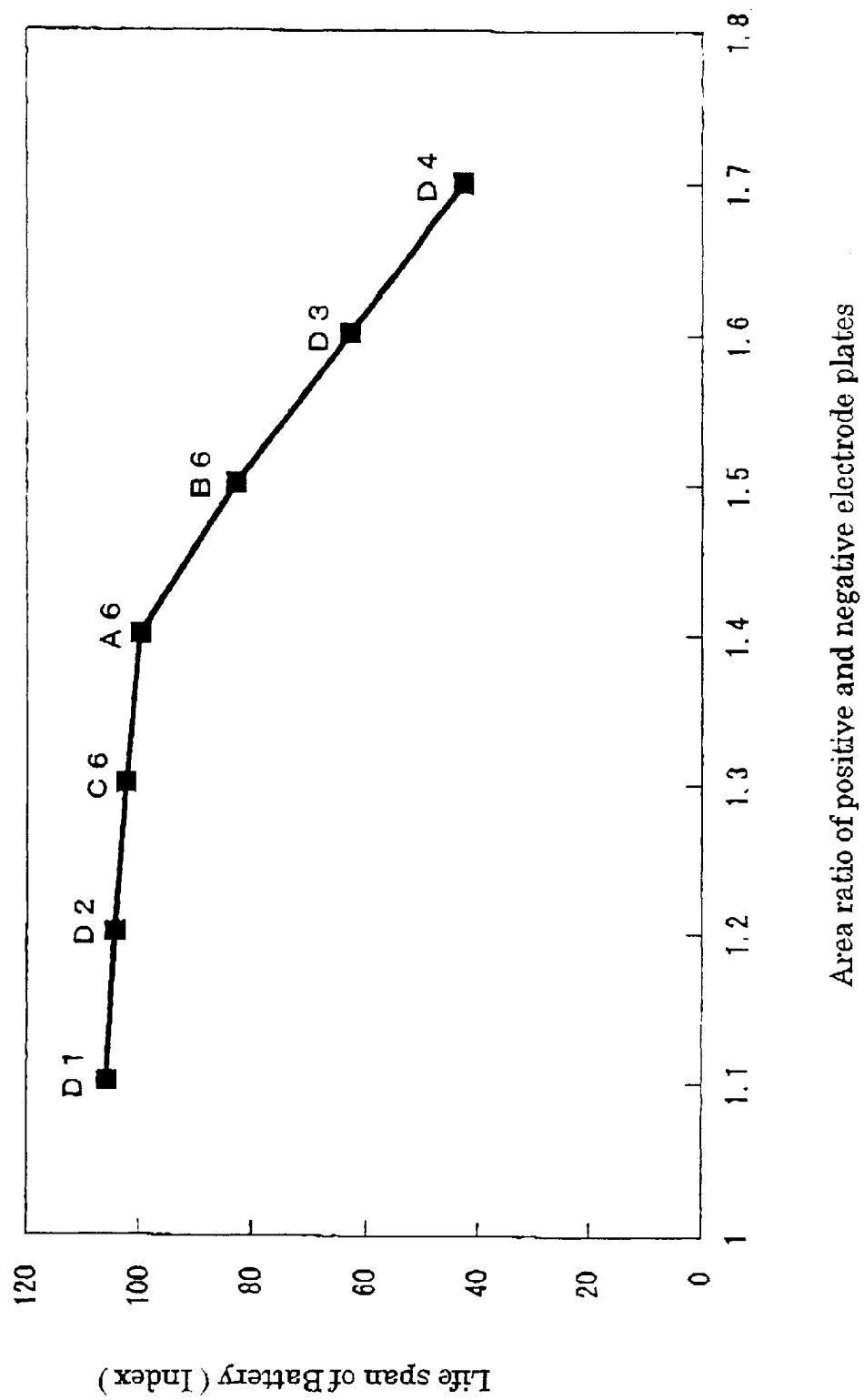
FIG. 2 is a graph showing each life span of the storage batteries in relation to an area ratio of the positive and negative electrode plates.

As is understood from FIG. 2, it has been found that the life span of each of the storage batteries D1, D2, C6, A6 of 1.4 in the area ratio of positive and negative electrode plates is increased more than that of each of the storage batteries B6, D3, D4 of more than 1.5 in the area ratio of positive and negative electrode plates. It is, therefore, desirable that the area ratio of the negative electrode plate to the positive electrode plate is determined to be less than or equal to 1.4.

6. Investigation of the Thickness of the Positive Electrode Plate

To investigate the continual charging characteristic in relations to the thickness of the storage batteries, the area ratio of the negative electrode plate of hydrogen absorbing alloy to the nickel positive electrode plate was determined to be 1.3, the discharge capacity ratio of the negative electrode plate to the positive electrode plate was determined to be 2.0, and each thickness of the positive electrode plates was determined to be 0.3, 0.4, 0.6, 0.7, 0.8, 0.9 and 1.0, respectively.

Thus, each group of spiral electrodes e1, e2, e3, e4, e5, e6, e7 was manufactured by spirally winding the positive and negative electrode plates through the separator of non-woven polyolefin fabric in such a manner that the negative electrode plate is placed at the outermost periphery of each group of spiral electrodes.

Subsequently, each group of spiral electrodes e1–e7 was contained in a bottomed cylindrical cell casing made of metal. Thereafter, a negative lead extended from the negative electrode plate was welded to a bottom of the cell casing, while a positive lead extended from the positive electrode plate was welded to a positive terminal in the form of a closure element. Subsequently, the cell casing was supplied with an amount of electrolyte (30% by weight of alkaline solution essentially comprised of sodium hydroxide and potassium hydroxide containing lithium hydroxide), and the closure element was coupled within an opening end of the cell casing through a gasket and secured in place by caulking to manufacture closed type nickel-metal hydride storage batteries E1–E7 each of 1500 mAh in nominal capacity.

The storage batteries E1–E7 each were continually charged at 40° C. for fourteen days to measure the life span of each of the storage batteries. A result of the measurement is shown in FIG. 3, wherein the life span of each of the storage batteries is shown in relation to the thickness of the positive electrode plate, and wherein the life span is represented by a relative index in the case that the life span of the storage battery A6 is defined as 100.

Figure 3:
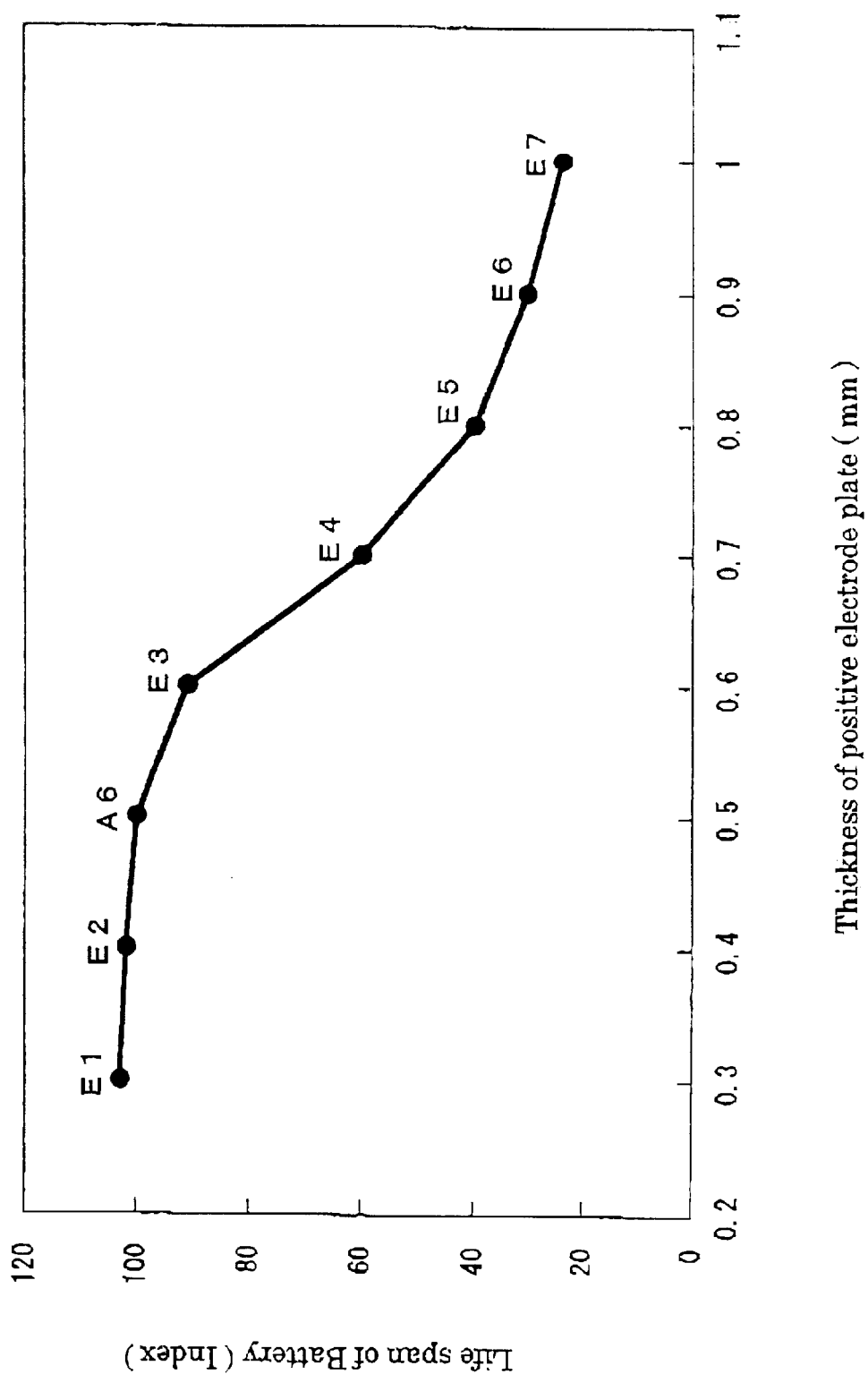
FIG. 3 is a graph showing each life span of the storage batteries in relation to the thickness of the positive and negative electrode plates.

As is understood from FIG. 3 it has been found that the life span of each of the storage batteries E3, A6, E2. E1 of less than 0.6. mm in thickness of the positive electrode plate is increased more than that of each of the storage batteries E4, E5, E6, E7 of more than 0.6 mm in thickness of the positive electrode plate. It is, therefore, desirable that the thickness of the positive electrode plate is determined to be equal to or less than 0.6 mm.

7. Investigation of Die Positive Electrode Active Material

A nickel-hydrogen storage battery F1 was manufactured in the same manner as in the nickel-hydrogen storage battery A6, provided that in the storage battery F1, powder of nickel hydroxide added with powder of cobalt hydroxide was used as a positive electrode active material. To measure the life span of the battery the storage battery F1 was continually charged at 40° C. for fourteen days until it becomes ineffective at discharging. A result of the measurement is shown in the following Table 1, wherein the life span is represented by a relative index in the case that the life span of the, storage battery A6 is defined as 100.

TABLE 1

| Kind of Battery | Life Span of Battery (Index) |
| --- | --- |
| A6 | 100 |
| F1 | 70 |

As is understood from the Table 1, it has been confirmed that the life span of the storage battery F1 is decreased less than that of the storage battery A6. In this respect it is seemed that the nickel hydroxide covered with the cobalt compound containing sodium causes an increase of the generation potential of oxygen gas and restrains the generation of oxygen gas to enhance the charging property of nickel hydroxide. As the cobalt compound is superior in conductivity, the conductivity between particles of nickel hydroxide is enhanced to increase the life span of the storage battery. Additionally, in the case that the nickel hydroxide covered with the cobalt compound containing sodium was added with oxide powder of yttrium (Y), ytterbium (YB), erbium (Er) or gadolinium (Gd), the generation potential of oxygen gas is increased by multiplication effect of the cobalt compound and the oxide powder to restrain the generation of oxygen gas and to enhance the charging property of nickel hydroxide.

From the foregoing facts in the case that the discharge capacity ratio of the negative electrode plate to the positive electrode plate is determined to be more than or equal to 1.9, the area ratio of the negative electrode plate to the positive electrode plate is determined to be less than or equal to 1.4, and the thickness of the positive electrode plate is determined to be less than or equal to 0.6 mm, a nickel-hydrogen storage battery superior in continual charging property can be obtained in use of the positive electrode active material essentially comprised of nickel hydroxide covered with the cobalt compound and added with at least one of the oxide powders of yttrium (Y), ytterbium (YB), erbium (Er) and gadolinium (Gd). Although in the embodiments described above, the present invention has been adapted to a nickel-metal hydride storage battery, the same result was obtained in the case that the present invention was adapted to a nickel-cadmium storage battery.

What is claimed is:

1. A sealed type alkaline storage battery including a cell casing supplied with an amount of alkaline solution and a group of spiral electrodes contained in the cell casing, said group of electrodes being composed of positive and negative electrode plates spirally wound with a separate interposed therebetween in such a manner that the entire surface of the positive electrode plate is opposed to the negative electrode plate through the separator, wherein a discharge capacity ratio of the entirety of the negative electrode plate to the entirety of the positive electrode plate is determined to be more than or equal to 1.9, an area ratio of the negative electrode plate to the positive electrode plate is determined to be more than 1.0 and less than or equal to 1.4, and the thickness of the positive electrode plate is determined to be less than or equal to 0.6 mm, thereby to enhance the absorption property of oxygen gas at the negative electrode plate.

2. A sealed type alkaline storage battery as claimed in claim 1, wherein the positive electrode plate is made of a foamed nickel substrate plate impregnated with an active material essentially comprised of nickel hydroxide covered with a cobalt compound containing sodium and added with at least one of oxide powders of yttrium (Y), ytterbium (YB), erbium (Er) and gadolinium (Gd).

* * * * *